(12) United States Patent
Kim

(10) Patent No.: US 8,890,381 B2
(45) Date of Patent: Nov. 18, 2014

(54) SPINDLE MOTOR

(75) Inventor: Jin San Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 250 days.

(21) Appl. No.: 13/608,152

(22) Filed: Sep. 10, 2012

(65) Prior Publication Data

US 2013/0082557 A1  Apr. 4, 2013

(30) Foreign Application Priority Data

Oct. 4, 2011  (KR) .......................... 10-2011-0100774

(51) Int. Cl.
  *H02K 5/16*  (2006.01)
(52) U.S. Cl.
  USPC .......................................... 310/90; 310/67 R
(58) Field of Classification Search
  USPC .......................................... 310/89–90, 67 R
  See application file for complete search history.

(56) References Cited

U.S. PATENT DOCUMENTS

| 6,781,268 B2 * | 8/2004 | Oku ................................. 310/90 |
| 6,920,013 B2 * | 7/2005 | Nishimura et al. ......... 360/99.08 |
| 7,825,557 B2 * | 11/2010 | Drautz et al. .................... 310/90 |
| 7,982,349 B2 * | 7/2011 | Popov et al. .................... 310/90 |
| 8,742,638 B1 * | 6/2014 | Sodeoka ......................... 310/90 |
| 2003/0197438 A1 * | 10/2003 | Oku ................................. 310/90 |
| 2009/0067765 A1 | 3/2009 | Kim |
| 2009/0140587 A1 * | 6/2009 | Popov et al. .................... 310/90 |
| 2009/0140588 A1 * | 6/2009 | Drautz et al. .................... 310/90 |

FOREIGN PATENT DOCUMENTS

| KR | 10-2004-0072577 | 8/2004 |
| KR | 10-2006-0114882 | 11/2006 |

* cited by examiner

*Primary Examiner* — Thanh Lam

(57) ABSTRACT

There is provided a spindle motor including: a sleeve rotatably supporting a shaft; a base member including a protrusion part having the sleeve fixed thereto; and a rotor hub coupled to the shaft and including an extension wall part allowing an interface between a lubricating fluid and air to be formed, together with an outer peripheral surface of the sleeve, wherein an outer peripheral surface of the extension wall part is inclined in order to prevent a scattering of leaked lubricating fluid, together with one end portion of the protrusion part of the base member.

8 Claims, 4 Drawing Sheets

SPINDLE MOTOR

CROSS-REFERENCE TO RELATED APPLICATIONS

This application claims the priority of Korean Patent Application No. 10-2011-0100774 filed on Oct. 4, 2011, in the Korean Intellectual Property Office, the disclosure of which is incorporated herein by reference.

BACKGROUND OF THE INVENTION

1. Field of the Invention

The present invention relates to a spindle motor.

2. Description of the Related Art

A small-sized spindle motor used for a hard disk drive (HDD) generally includes a hydrodynamic bearing assembly. This hydrodynamic bearing assembly is provided with a bearing clearance so that a lubricating fluid may be filled therein.

In addition, at the time of the rotation of a shaft, the lubricating fluid filled in the bearing clearance may be pumped to form fluid dynamic pressure, thereby rotatably supporting the shaft.

Meanwhile, the hydrodynamic bearing assembly may include a sealing cap allowing an interface between the lubricating fluid and air to be formed in order to suppress leakage of the lubricating fluid.

That is, the sealing cap serves to form the interface (that is, a liquid-vapor interface) between the lubricating fluid and the air so that the lubricating fluid is not leaked due to a capillary phenomenon in a normal driving state of the spindle motor.

However, when an external impact occurs, the lubricating fluid may be leaked, from a side at which the liquid-vapor interface is formed, to the outside. When the lubricating fluid is leaked to the outside as described above, an inner portion of the spindle motor may be polluted by the lubricating fluid.

In addition, when the lubricating fluid is leaked, the fluid dynamic pressure generated by the pumping of the lubricating fluid may be deteriorated, such that ultimately, the performance of the spindle motor is deteriorated.

Further, a lifespan of the spindle motor may be shortened due to the leakage of the lubricating fluid.

SUMMARY OF THE INVENTION

An aspect of the present invention provides a spindle motor capable of suppressing the scattering of leaked lubricating fluid.

According to an aspect of the present invention, there is provided a spindle motor including: a sleeve rotatably supporting a shaft; a base member including a protrusion part having the sleeve fixed thereto; and a rotor hub coupled to the shaft and including an extension wall part allowing an interface between a lubricating fluid and air to be formed, together with an outer peripheral surface of the sleeve, wherein an outer peripheral surface of the extension wall part is inclined in order to prevent a scattering of leaked lubricating fluid, together with one end portion of the protrusion part of the base member.

The protrusion part may have a cylindrical wall extended to face the extension wall part.

The outer peripheral surface of the extension wall part may be inclined in such a manner that a clearance formed by the outer peripheral surface of the extension wall part and the cylindrical wall becomes wider upwardly in an axial direction.

The cylindrical wall may be extended upwardly from an edge of an upper surface of the protrusion part having a cylindrical shape in the axial direction in such a manner that the extension wall part is disposed inwardly thereof in a radial direction.

The extension wall part may have a cut surface formed in a lower end portion thereof so that the lubricating fluid introduced into a clearance formed by the extension wall part and the cylindrical wall is discharged downwardly.

The protrusion part disposed to face the cut surface may be provided with a corresponding surface corresponding to the cut surface.

The cylindrical wall may have a chamfer part formed in an inner diameter portion thereof in order to prevent an interference with the extension wall part at the time of insertion of the extension wall part.

The rotor hub may include: a body provided with an installation hole into which the shaft is inserted; a magnet mounting part extended from an edge of the body downwardly in an axial direction; a disk mounting part extended from a distal end of the magnet mounting part outwardly in a radial direction; and the extension wall part extended from a lower surface of the body so as to be spaced apart from the magnet mounting part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, when it is determined that the detailed description of the known art related to the present invention may obscure the gist of the present invention, the detailed description thereof will be omitted.

Figure 1:
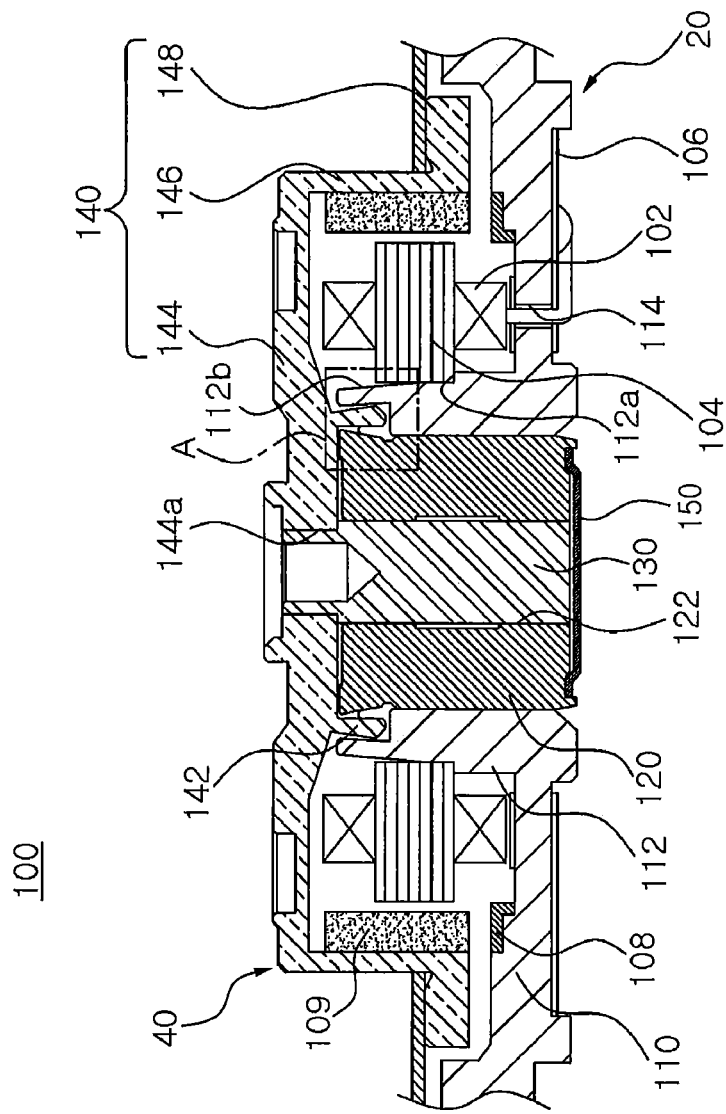
FIG. 1 is a schematic cross-sectional view showing a spindle motor according to an embodiment of the present invention.
Figure 2:
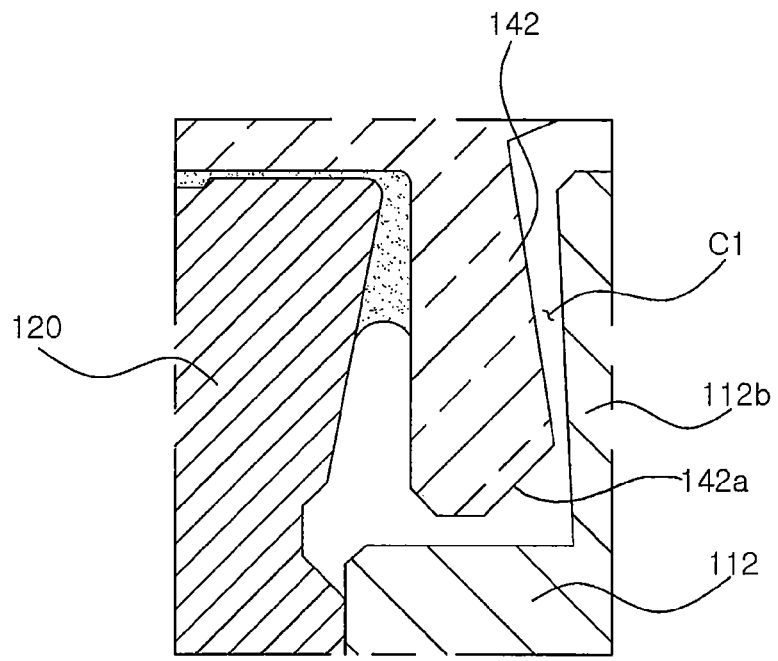
FIG. 2 is an enlarged view of part A of FIG. 1.
Figure 3:
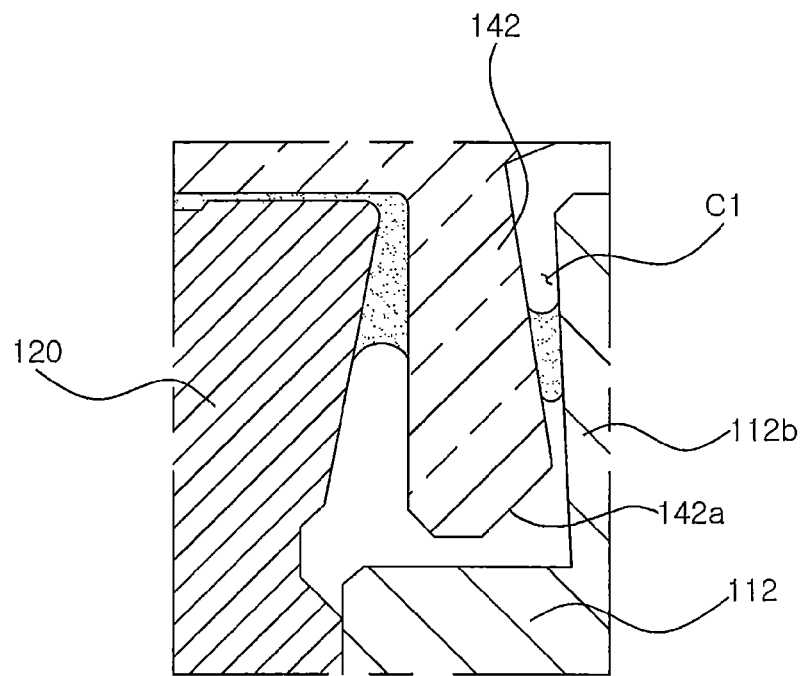
FIGS. 3 and 4 are views describing an operation of the spindle motor according to the embodiment of the present invention.
Figure 4:
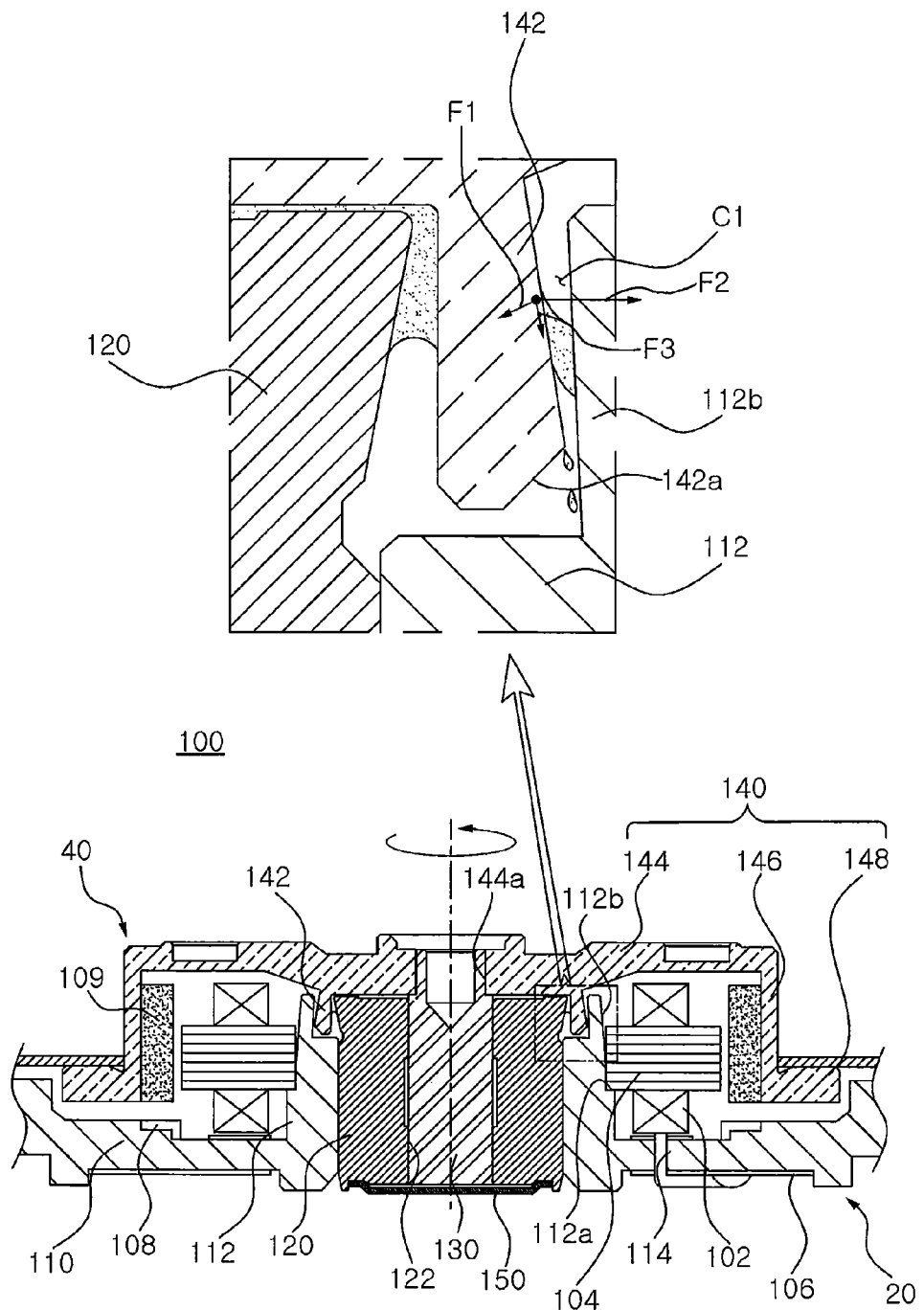

FIG. 1 is a schematic cross-sectional view showing a spindle motor according to an embodiment of the present invention. FIG. 2 is an enlarged view of part A of FIG. 1. FIGS. 3 and 4 are views describing an operation of the spindle motor according to the embodiment of the present invention.

Referring to FIGS. 1 through 4, a spindle motor 100 according to the embodiment of the present invention may include a base member 110, a sleeve 120, a shaft 130, and a rotor hub 140.

Here, terms with respect to directions will be defined. As viewed in FIG. 1, an axial direction refers to a vertical direction, that is, a direction from a lower portion of the shaft 130 toward an upper portion thereof or a direction from the upper portion of the shaft 130 toward the lower portion thereof, and a radial direction refers to a horizontal direction, that is, a direction from an outer peripheral surface of the rotor hub 140 toward the shaft 130 or a direction from the shaft 130 toward the outer peripheral surface of the rotor hub 140.

In addition, a circumferential direction refers to a rotation direction along an outer peripheral surface of the rotor hub 140 or the shaft 130.

The base member 110, a fixed member rotatably supporting a rotor 40, that is, a rotating component, may be a component included in a stator 20.

The base member 110 may include a protrusion part 112 having the sleeve 120 inserted therein. The protrusion part 112 may protrude upwardly in the axial direction and have a hollow cylindrical shape. In addition, the sleeve 120 may be inserted in the protrusion part 112.

Meanwhile, the protrusion part 112 may include a stator core 104 fixed to an outer peripheral surface thereof, the stator core 104 having a coil 102 wound therearound. That is, the stator core 104 may be fixed to the protrusion part 112 by an adhesive while being seated on a seating surface 112a formed on an outer peripheral surface of the protrusion part 112.

Meanwhile, the protrusion part 112 may include a cylindrical wall 112b extended upwardly from an edge of an upper surface thereof in the axial direction. The detailed description thereof will be provided below.

In addition, the base member 110 may include a lead hole 114 formed therein in order to lead the coil 102 wound around the stator core 104. Further, a circuit board 106 electrically connected to one end of the coil 102 leading through the lead hole 114 may be installed on a lower surface of the base member 110. Meanwhile, the circuit board 106 may be a flexible circuit board.

In addition, although the embodiment describes a case in which the circuit board 106 is installed on the lower surface of the base member 110 by way of example, the present invention is not limited thereto. That is, the circuit board 106 may also be formed on an upper surface of the base member 110.

Further, the base member 110 may include a pulling plate 108 installed thereon to thereby suppress excessive floating of the rotor hub 140.

The sleeve 120, a fixed member rotatably supporting the rotor 40, that is, the rotating component, together with the base member 110, may be a component included in the stator 20.

In addition, the sleeve 120 may be fixed the protrusion part 112 as described above. Further, the sleeve 120 may have a hollow cylindrical shape so that a through-hole 122 is formed at the center thereof.

Meanwhile, in a case in which the shaft 130 is inserted into the sleeve 120, an inner peripheral surface of the sleeve 120 and an outer peripheral surface of the shaft 130 may be spaced apart from each other by a predetermined interval to thereby form a bearing clearance therebetween. This bearing clearance may be filled with a lubricating fluid.

In addition, the sleeve 120 may include a cover member 150 installed on a lower portion thereof in order to prevent the filled lubricating fluid from being leaked toward the lower portion thereof.

Here, the bearing clearance in which the lubricating fluid is filled will be described in detail. First, as described above, the bearing clearance is formed by the inner peripheral surface of the sleeve 120 and the outer peripheral surface of the shaft 130. In addition, in a case in which the cover member 150 is installed on the sleeve 120, a bearing clearance may also be formed by the sleeve 120, the shaft 130, and the cover member 150. Further, a bearing clearance may also be formed by the sleeve 120 and the rotor hub 140.

That is, the spindle motor 100 according to the embodiment of the present invention has a full-fill structure in which all of the above-mentioned bearing clearances are filled with the lubricating fluid.

In addition, the sleeve 120 may have dynamic pressure grooves (not shown) formed in an inner surface thereof in order to generate fluid dynamic pressure by pumping the lubricating fluid filled in the bearing clearance. That is, at the time of the rotation of the shaft 130, the lubricating fluid filled in the bearing clearance may be pumped by the dynamic grooves to thereby generate fluid dynamic pressure in the radial direction.

Due to the fluid dynamic pressure generated in the radial direction as described above, the shaft 130 may more stably rotate at the time of the rotation thereof.

Meanwhile, the dynamic groove may have a herringbone shape or a spiral shape. In addition, the dynamic grooves may be formed at upper and lower portions of the inner surface of the sleeve 120 so as to be spaced apart from each other.

However, a shape and the number of dynamic grooves are not limited thereto but may be variously changed. In other words, the dynamic grooves may have any shape or any number of the dynamic grooves may be provided, as long as the dynamic groove may pump the lubricating fluid filled in the bearing clearance to thereby generate the fluid dynamic pressure.

In addition, an upper end portion of the sleeve 120 may have an outer diameter larger than that of a lower end portion thereof so that an interface between the lubricating fluid and air may be formed. In other words, an upper end portion of an outer peripheral surface of the sleeve 120 may be outwardly inclined upwardly in the radial direction.

In addition, the sleeve 120 may have a thrust dynamic groove (not shown) formed in an upper surface thereof in order to generate thrust fluid dynamic pressure at the time of the rotation of the rotor hub 140. Therefore, at the time of the rotation of the rotor hub 140, the thrust fluid dynamic pressure maybe generated, such that the rotor hub 140 may stably rotate in a state in which the rotor hub 140 is floated at a predetermined height.

The shaft 130 may be a rotating member included in the rotor 40 rotatably supported by the stator 20.

The shaft 130 may be rotatably supported by the sleeve 120 as described above. That is, the shaft 130 may be inserted into the through-hole 122 of the sleeve 120. Here, an upper end portion of the shaft 130 may be disposed to protrude upwardly of the sleeve 120.

Further, the shaft 130 may have the rotor hub 140 fixedly into the upper end portion thereof. That is, the shaft 130 may be coupled to the rotor hub 140 so as to rotate together therewith at the time of the rotation of the rotor hub 140.

The rotor hub 140 may also be a rotating member included in the rotor 40 rotatably supported by the stator 20, together with the shaft 130.

In addition, the rotor hub 140 may be coupled to the shaft 130, as described above and include an extension wall part 142 allowing an interface between the lubricating fluid and the air to be formed, together with the outer peripheral surface of the sleeve 120.

Meanwhile, the rotor hub 140 may include a body 144 provided with an installation hole 144a into which the shaft 130 is inserted, a magnet mounting part 146 extended from an edge of the body 144 downwardly in the axial direction, a disk mounting part 148 extended from a distal end of the magnet mounting part 146 outwardly in the radial direction, and the extension wall part 142 extended from a lower surface of the body 144 so as to be spaced apart from the magnet mounting part 146.

The body 144 may have a disk shape, and the upper end portion of the shaft 130 may be inserted and fixed into the installation hole 144a. Therefore, the rotor hub 140 and the shaft 130 may rotate together with each other.

In addition, the magnet mounting part 146 may have a driving magnet 109 installed on an inner surface thereof, the driving magnet 109 being disposed to face a front end of the stator core 14 having the coil 102 wound around.

Meanwhile, the driving magnet 109 may have an annular ring shape and be a permanent magnet generating magnetic force having a predetermined strength by alternately magnetizing an N pole and an S pole in the circumferential direction.

Here, the rotational driving of the rotor hub 140 will be schematically described. When power is supplied to the coil 102 wound around the stator core 104, driving force capable of rotating the rotor hub 140 is generated by electromagnetic interaction between the driving magnet 109 and the stator core 104 having the coil 102 wound therearound.

Therefore, the rotor hub 140 rotates, such that the shaft 130 to which the rotor hub 140 is fixedly coupled may rotate together with the rotor hub 140.

In addition, an outer peripheral surface of the extension wall part 142 extended from the lower surface of the body 144 may be inclined in order to prevent the scattering of leaked lubricating fluid, together with one end portion of the protrusion part 112 of the base member 110

That is, the outer peripheral surface of the extension wall part 142 maybe disposed to face an inner peripheral surface of the cylindrical wall 112b of the protrusion part 112. In addition, the outer peripheral surface of the extension wall part 142 may be inclined such that a clearance C1 formed by the outer peripheral surface of the extension wall part 142 and the inner peripheral surface of the cylindrical wall 112b becomes wider upwardly in the axial direction.

In addition, the cylindrical wall 112b may be extended upwardly from the edge of the upper surface of the protrusion part 112 having a cylindrical shape in the axial direction so that the extension wall part 142 may be disposed inwardly in the radial direction.

Here, an operation of the extension wall part 142 will be described in more detail. When an external impact is applied, the lubricating fluid may be leaked from a liquid-vapor interface (that is, an interface between the lubricating fluid and the air) formed in a space between the outer peripheral surface of the sleeve 120 and the inner peripheral surface of the extension wall part 142.

In addition, a portion of the leaked lubricating fluid may be introduced into the clearance C1 formed by the outer peripheral surface of the extension wall part 142 and the inner peripheral surface of the cylindrical wall 112b. Here, since the outer peripheral surface of the extension wall part 142 is inclined as shown in FIG. 3, the lubricating fluid introduced into the clearance C1 formed by the outer peripheral surface of the extension wall part 142 and the inner peripheral surface of the cylindrical wall 112b does not move upwardly of the clearance C1 due to a capillary phenomenon.

Further, at the time of the rotation of the rotor hub 140, the lubricating fluid introduced into the clearance C1 formed by the outer peripheral surface of the extension wall part 142 and the inner peripheral surface of the cylindrical wall 112b is inclined toward the extension wall part 142 by centrifugal force as shown in FIG. 4. At this time, force directed downwardly in the axial direction is generated by the centrifugal force, such that the lubricating fluid introduced into the clearance C1 may drop downwardly from the clearance C1.

More specifically, first, in the case in which the lubricating fluid is introduced into the clearance C1, force allowing the lubricating fluid to be adhered to the outer peripheral surface of the extension wall part 142, that is, adhesion force F1 maybe generated. This adhesion force F1 may act in a direction perpendicular to the outer peripheral surface of the extension wall part 142.

In addition, centrifugal force F2 may be generated outwardly in the radial direction at the time of the rotation of the rotor hub 140.

A resultant force F3 of the adhesion force F1 and centrifugal force F2 is applied to the lubricating fluid introduced into the clearance C1 downwardly along the outer peripheral surface of the extension wall part 142, such that the lubricating fluid may drop downwardly from the clearance C1 in the axial direction at the time of the rotation of the rotor hub 140.

As described above, the outer peripheral surface of the extension wall part 142 may be inclined, thereby suppressing the lubricating fluid from being leaked and scattered upwardly from the clearance C1.

In addition, the extension wall part 142 may have a cut surface 142a formed in a lower end portion thereof so that the lubricating fluid introduced into the clearance C1 formed by the extension wall part 142 and the cylindrical wall 112b may be easily discharged downwardly.

That is, since a distal end portion of the clearance C1 is expanded by the cut surface 142a, the lubricating fluid introduced into the clearance C1 may be more easily discharged from the clearance.

As described above, with the extension wall part 142 having the inclined outer peripheral surface and the cylindrical wall 112b disposed to face the extension wall part 142, the leaked lubricating fluid is reintroduced by the rotation of the rotor hub 140, whereby contamination due to the leaked lubricating fluid may be suppressed.

That is, the leaked lubricating fluid may be positioned in a space formed by the protrusion part 112, the sleeve 120, and the rotor hub 140, whereby the scattering of the lubricating fluid may be suppressed.

Hereinafter, a spindle motor according to another embodiment of the present invention will be described with reference to the accompanying drawings. However, a detailed description of components, the same as the above-mentioned components will be omitted, and a configuration different from that of the spindle motor according to the embodiment of the present invention described above will be described.

Figure 5:
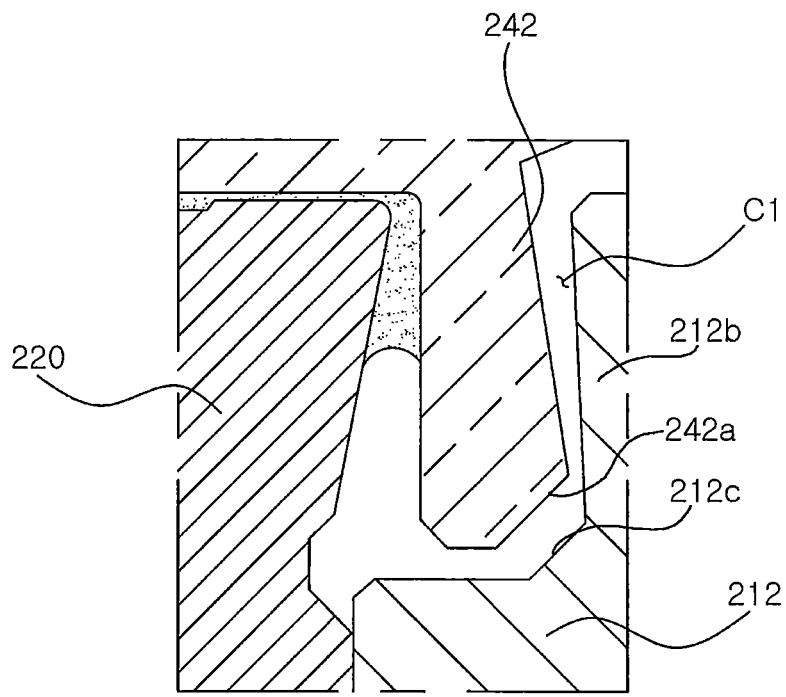
FIG. 5 is an enlarged view showing a portion of a spindle motor according to another embodiment of the present invention, the portion corresponding to part A of FIG. 1.

FIG. 5 is an enlarged view showing a portion of a spindle motor according to another embodiment of the present invention, the portion corresponding to part A of FIG. 1.

Referring to FIG. 5, a protrusion part 212 having a sleeve 220 fixedly thereto may have a cylindrical wall 212b disposed to face an extension wall part 242.

In addition, an outer peripheral surface of the extension wall part 242 may be disposed to face one end portion of the protrusion part 212, in other words, an inner peripheral surface of the cylindrical wall 212b and be inclined so that the clearance C1 formed by the outer peripheral surface of the extension wall part 242 and an inner peripheral surface of the cylindrical wall 212b becomes wider upwardly in the axial direction In addition, the cylindrical wall 212b may be extended upwardly from an edge of an upper surface of the protrusion part 212 having a cylindrical shape in the axial direction so that the extension wall part 242 is disposed inwardly thereof in the radial direction.

Here, an operation of the extension wall part 242 will be described in more detail. When an external impact is applied, the lubricating fluid may be leaked from a liquid-vapor interface formed in a space between the outer peripheral surface of the sleeve 220 and the inner peripheral surface of the extension wall part 242.

In addition, a portion of the leaked lubricating fluid may be introduced into the clearance C1 formed by the outer peripheral surface of the extension wall part 242 and the inner peripheral surface of the cylindrical wall 212b. Here, since the outer peripheral surface of the extension wall part 242 is inclined, the lubricating fluid introduced into the clearance C1 formed by the outer peripheral surface of the extension wall part 242 and the inner peripheral surface of the cylindrical wall 212b does not move upwardly of the clearance C1 due to a capillary phenomenon.

Further, at the time of the rotation of the rotor hub 140 (See FIG. 1), the lubricating fluid introduced into the clearance C1 formed by the outer peripheral surface of the extension wall part 242 and the inner peripheral surface of the cylindrical wall 212b is inclined toward the extension wall part 242 by centrifugal force. At this time, force directed downwardly in the axial direction is generated by the centrifugal force, such that the lubricating fluid introduced into the clearance C1 may drop downwardly from the clearance C1.

More specifically, first, in a case in which the lubricating fluid is introduced into the clearance C1, force allowing the lubricating fluid to be adhered to the outer peripheral surface of the extension wall part 242, that is, the adhesion force F1 may be applied to the lubricating fluid. This adhesion force F1 may act in a direction perpendicular to the outer peripheral surface of the extension wall part 242.

In addition, the centrifugal force F2 may be generated outwardly in the radial direction at the time of the rotation of the rotor hub 140.

The resultant force F3 of the adhesion force F1 and centrifugal force F2 is applied to the lubricating fluid introduced into the clearance C1 downwardly along the outer peripheral surface of the extension wall part 142, such that the lubricating fluid may drop downwardly from the clearance C1 in the axial direction at the time of the rotation of the rotor hub 140.

As described above, the outer peripheral surface of the extension wall part 242 may be inclined, thereby suppressing the lubricating fluid from being leaked and scattered upwardly from the clearance C1.

In addition, the extension wall part 242 may have a cut surface 242a formed in a lower end portion thereof so that the lubricating fluid introduced into the clearance C1 formed by the extension wall part 242 and the cylindrical wall 212b may be easily discharged downwardly.

That is, since the distal end portion of the clearance C1 is expanded by the cut surface 242a, the lubricating fluid introduced into the clearance C1 may be more easily discharged from the clearance C1.

In addition, the protrusion part 212 disposed to face the cut surface 242a may be provided with a corresponding surface 212c corresponding to the cut surface 242a.

Therefore, the lubricating fluid discharged from the clearance C1 flows down along the corresponding surface 212c to move inwardly in the radial direction. Therefore, at the time of a external impact, the reintroduction of the lubricating fluid into the clearance C1 may be suppressed.

As a result, the scattering of the lubricating fluid may be further suppressed through the corresponding surface 212c.

Figure 6:
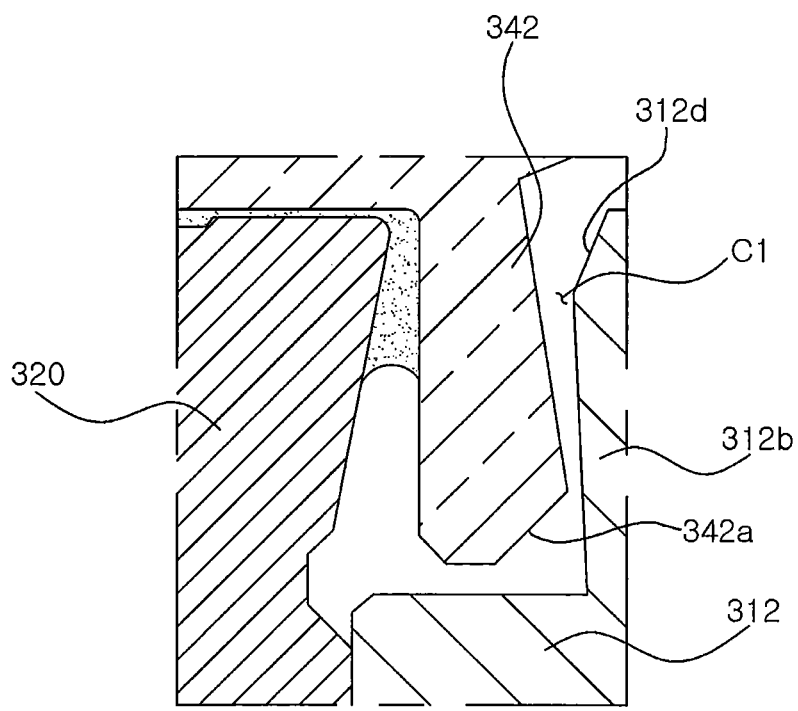
FIG. 6 is an enlarged view showing a portion of a spindle motor according to another embodiment of the present invention, the portion corresponding to part A of FIG. 1.

FIG. 6 is an enlarged view showing a portion of a spindle motor according to another embodiment of the present invention, the portion corresponding to part A of FIG. 1.

Referring to FIG. 6, a protrusion part 312 having a sleeve 320 fixed thereto may have a cylindrical wall 312b disposed to face an extension wall part 342.

In addition, an outer peripheral surface of the extension wall part 342 may be disposed to face one end portion of the protrusion part 312, in other words, an inner peripheral surface of the cylindrical wall 312b and be inclined so that the clearance C1 formed by the outer peripheral surface of the extension wall part 342 and an inner peripheral surface of the cylindrical wall part 312b becomes wider upwardly in the axial direction.

In addition, the cylindrical wall 312b may be extended upwardly from an edge of an upper surface of the protrusion part 312 having a cylindrical shape in the axial direction so that the extension wall part 342 is disposed inwardly thereof in the radial direction.

Here, an operation of the extension wall part 342 will be described in more detail. When an external impact is applied, the lubricating fluid may be leaked from a liquid-vapor interface formed in a space between the outer peripheral surface of the sleeve 320 and the inner peripheral surface of the extension wall part 342.

In addition, a portion of the leaked lubricating fluid may be introduced into the clearance C1 formed by the outer peripheral surface of the extension wall part 342 and the inner peripheral surface of the cylindrical wall 312b. Here, since the outer peripheral surface of the extension wall part 342 is inclined, the lubricating fluid introduced into the clearance C1 formed by the outer peripheral surface of the extension wall part 342 and the inner peripheral surface of the cylindrical wall 312b does not move upwardly of the clearance C1 due to a capillary phenomenon.

Further, at the time of the rotation of the rotor hub 140 (See FIG. 1), the lubricating fluid introduced into the clearance C1 formed by the outer peripheral surface of the extension wall part 342 and the inner peripheral surface of the cylindrical wall 312b is inclined toward the extension wall part 342 by the centrifugal force. At this time, force directed downwardly in the axial direction is generated by the centrifugal force, such that the lubricating fluid introduced into the clearance C1 may drop downwardly from the clearance C1.

More specifically, first, in a case in which the lubricating fluid is introduced into the clearance C1, force allowing the lubricating fluid to be adhered to the outer peripheral surface of the extension wall part 342, that is, the adhesion force F1 may be applied to the lubricating fluid. This adhesion force F1 may act in a direction perpendicular to the outer peripheral surface of the extension wall part 342.

In addition, the centrifugal force F2 may be generated in outwardly in the radial direction at the time of the rotation of the rotor hub 140.

The resultant force F3 of the adhesion force F1 and centrifugal force F2 is applied to the lubricating fluid introduced into the clearance C1 downwardly along the outer peripheral surface of the extension wall part 342, such that the lubricating fluid may drop downwardly from the clearance C1 in the axial direction at the time of the rotation of the rotor hub 140.

As described above, the outer peripheral surface of the extension wall part 342 may be inclined, thereby suppressing the lubricating fluid from being leaked and scattered upwardly from the clearance C1.

In addition, the extension wall part 342 may have a cut surface 342a formed in a lower end portion thereof so that the lubricating fluid introduced into the clearance C1 formed by the extension wall part 342 and the cylindrical wall 312b may be easily discharged downwardly.

That is, since the distal end portion of the clearance C1 is expanded by the cut surface 342a, the lubricating fluid introduced into the clearance C1 may be more easily discharged from the clearance C1.

Meanwhile, the cylindrical wall 312b may have a chamfer part 312d formed in an inner diameter portion thereof in order to prevent an interference with the extension wall part 342 at the time of insertion of the extension wall part 342 in an assembling process. Therefore, deformation or damage of the extension wall part 342 during the assembling process may be suppressed.

As a result, the damage and the deformation of the extension wall part 342 are reduced by the chamfer part 312d, whereby the scattering of the lubricating fluid may be further suppressed.

As set forth above, according to the embodiments of the present invention, with the extension wall part having the inclined outer peripheral surface and the cylindrical wall disposed to face the extension wall part, the reintroduction of the leaked lubricating fluid by the centrifugal force can be allowed, whereby contamination due to the leaked lubricating fluid can be suppressed.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
    a sleeve rotatably supporting a shaft;
    a base member including a protrusion part having the sleeve fixed thereto; and
    a rotor hub coupled to the shaft and including an extension wall part allowing an interface between a lubricating fluid and air to be formed, together with an outer peripheral surface of the sleeve,
    wherein an outer peripheral surface of the extension wall part is inclined in order to prevent a scattering of leaked lubricating fluid, together with one end portion of the protrusion part of the base member.

2. The spindle motor of claim 1, wherein the protrusion part has a cylindrical wall extended to face the extension wall part.

3. The spindle motor of claim 2, wherein the outer peripheral surface of the extension wall part is inclined in such a manner that a clearance formed by the outer peripheral surface of the extension wall part and the cylindrical wall becomes wider upwardly in an axial direction.

4. The spindle motor of claim 2, wherein the cylindrical wall is extended upwardly from an edge of an upper surface of the protrusion part having a cylindrical shape in the axial direction in such a manner that the extension wall part is disposed inwardly thereof in a radial direction.

5. The spindle motor of claim 2, wherein the extension wall part has a cut surface formed in a lower end portion thereof so that the lubricating fluid introduced into a clearance formed by the extension wall part and the cylindrical wall is discharged downwardly.

6. The spindle motor of claim 5, wherein the protrusion part disposed to face the cut surface is provided with a corresponding surface corresponding to the cut surface.

7. The spindle motor of claim 2, wherein the cylindrical wall has a chamfer part formed in an inner diameter portion thereof in order to prevent an interference with the extension wall part at the time of insertion of the extension wall part.

8. The spindle motor of claim 1, wherein the rotor hub includes:
    a body provided with an installation hole into which the shaft is inserted;
    a magnet mounting part extended from an edge of the body downwardly in an axial direction;
    a disk mounting part extended from a distal end of the magnet mounting part outwardly in a radial direction; and
    the extension wall part extended from a lower surface of the body so as to be spaced apart from the magnet mounting part.

* * * * *